Figure 1:
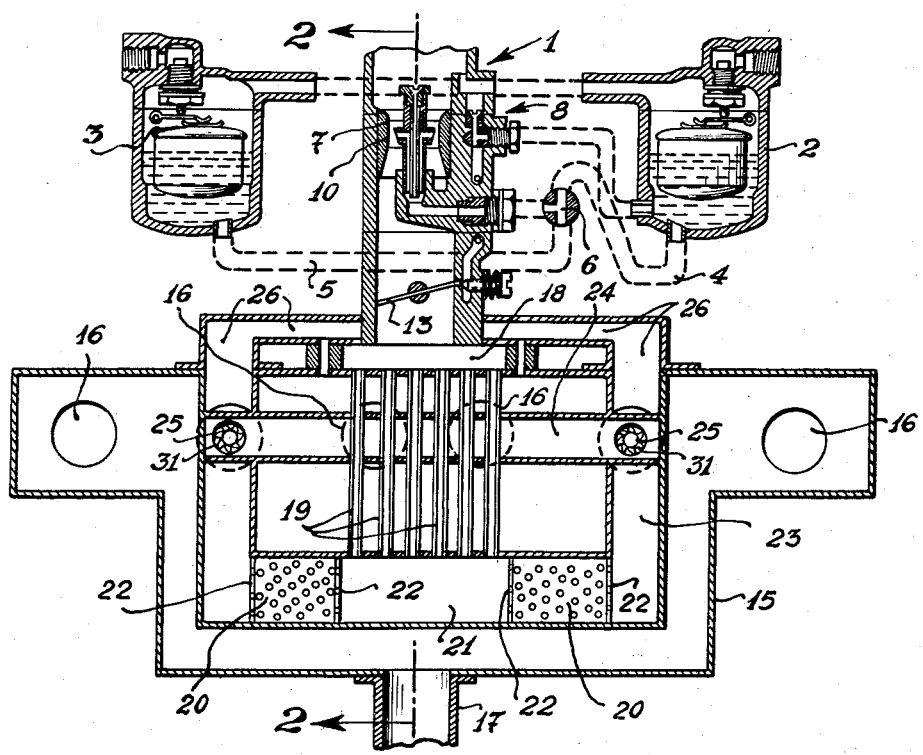

May 6, 1958 P. AUGUST 2,833,262
FUEL-GASIFYING DEVICE FOR GASOLINE ENGINES
Filed Sept. 13, 1954 3 Sheets-Sheet 1

INVENTOR.
PABLO AUGUST
BY Toulmin & Toulmin
ATTORNEYS

May 6, 1958   P. AUGUST   2,833,262
FUEL-GASIFYING DEVICE FOR GASOLINE ENGINES
Filed Sept. 13, 1954   3 Sheets-Sheet 2

INVENTOR.
PABLO AUGUST
BY
ATTORNEYS

May 6, 1958 P. AUGUST 2,833,262
FUEL-GASIFYING DEVICE FOR GASOLINE ENGINES
Filed Sept. 13, 1954 3 Sheets-Sheet 3

INVENTOR.
PABLO AUGUST
BY Toulmin & Toulmin
ATTORNEYS

United States Patent Office 2,833,262
Patented May 6, 1958

2,833,262
FUEL-GASIFYING DEVICE FOR GASOLINE ENGINES

Pablo August, Buenos Aires, Argentina

Application September 13, 1954, Serial No. 455,471

5 Claims. (Cl. 123—133)

My present invention relates to gasoline engines, more particularly, refers to certain new and useful improvements in the gasification means for said engines which are capable of ensuring a perfect and complete combustion not only of gasoline and like low-boiling fuels, but also of relatively high-boiling fuels, such as gas oil, kerosene and the like, in the usual carburetor gasoline engines and of thereby considerably reducing the operating expenses of the same.

Several propositions have already been made for the use of high-boiling fuels in carburetor gasoline engines. However, a satisfactory result has not yet been obtained.

In view of that these fuels have a boiling range of up to 350° C., a gasification or at least a suitable atomization of the same cannot be attained in the usual gasoline engines. On its way from the carburetor to the working cylinders the fuel-air mixture is subject to condensation to such a degree that a considerable portion (of up to 30%) of the fuel reaches the cylinders in a liquid state. This fuel condensate, in as far as it travels along the cylinder walls, becomes mixed with the lubricant oil and seriously affects the lubrication of the working pistons. The condensed fuel particles deposited on the valves, in the cylinder heads and on the piston tops, undergo an incomplete combustion and form within a relatively short time so much carbonised oil that the engine does not satisfactorily operate.

Another disadvantage of the use of high-boiling fuels in the usual gasoline engines is due to their low octane number. The engines with the normally low compression ratio for benzine are subject to the well-known knocking if they are operated with a fuel having an octane number below 60.

It has been tried to overcome these two essential difficulties, which render the high-boiling fuels unsuitable for being used in gasoline engines, by heating the fuel and the combustion air before they enter the carburetor, preferably by means of the exhaust gases. The fuel, however, can be preheated only to such a degree that it is not evaporated although the engine works under full load. If the fuel becomes evaporated, the pressure built up would render the float valve inoperative and the engine would receive too much fuel.

The fuel-air mixture, too, cannot be preheated to any desired temperature, because if it reaches the working cylinders with a temperature above 100° C. the internal cooling of the engine will be counteracted to such a degree that the engine becomes too hot, that the valves get burned, that the bearings are damaged, that self-ignition is produced and that the output of the engine is considerably depressed.

At the other hand, in order to gasify the high-boiling fuel in such a manner that it does not form a condensate or if it does to such a small extent that it has no influence upon the operation of the engine, but still ensures a perfect combustion, the fuel-air mixture would have to be heated to a temperature above 250° C. This, however, is impossible for the reasons as hereinbefore set forth and, therefore, the propositions as hitherto made were unable to give satisfactory results.

The present invention aims at solving the problem referred to and its main object is to provide improved fuel-gasifying means for use in gasoline engines, comprising a carburetor arranged for the supply of a fuel-air mixture containing an excess of fuel, in combination with a heating device for thermally treating said fuel-air mixture, and air admission and mixing means for mixing the treated gas mixture from said heating device with a required addition of fresh combustion air from a separate air inlet means and for supplying the so prepared final fuel-air mixture to the working cylinders.

In accordance with this invention, the carburetor produces a fuel-air mixture which for lack of the required quantity of air is not inflammable, this fuel-air mixture is thermally treated and practically cracked in the heating device connected with said carburetor and by the admixture of additional fresh air to the elaborated gas mixture, the resulting final fuel-air mixture not only contains the required quantity of combustion air, but also is cooled down to the temperature suitable for the engine.

Thus, the fuel-gasification means according to this invention complies with the two fundamental conditions for the use of high-boiling fuels in the usual gasoline engines. At the one hand, in the said heating device the fuel is gasified at the required high temperature and simultaneously cracked with the advantageous result that its octane number is raised, whereas, at the other hand, by the supply of the addition of fresh air the treated fuel-air mixture is rendered inflammable and at the same time is cooled down to the temperature suitable for the engine.

Conveniently the carburetor of the engine according to the invention is provided with two float chambers, one for benzine or gasoline and the other one for a high-boiling fuel. The first mentioned float chamber is directly connected with the idling system of the carburetor so that its idling nozzle is directly supplied with the low-boiling fuel from said float chamber, whereas its main nozzle is connected with a casing containing a three-way valve for communicating the same selectively with one or another of said two float chambers. In addition, the carburetor may be provided with a full-load nozzle conveniently connected to the float chamber for the low-boiling fuel in order to supply a fuel-air mixture with a higher gasoline proportion when the engine works under higher load.

In accordance with a characteristic feature of the invention, the said separate air-admission tube is provided with a Venturi and with a throttle valve and the Venturi of the carburetor is in determined proportion with that of said air-admission tube, the cross sectional area of the carburetor Venturi less the cross sectional area of its main nozzle being e. g. about one fourth of the cross sectional area of the Venturi of the air admission tube. In this case the cross section of the carburetor at the level of its throttle valve will also be one fourth of the cross section of the Venturi of said air-admission tube at the level of its throttle valve. According to the invention, the two throttle valves are operatively interconnected.

An additional object of the invention consists in providing improved fuel-gasification means for gasoline engines, wherein the said heating device for thermally treating the fuel-air mixture supplied by the carburetor receives the heat from the exhaust gases of the motor and comprises a cracking chamber at least partly filled with a catalytic material, wherein said mixture is elaborated with the advantageous result that its octane number is increased.

A further object of the invention consists in providing improved fuel-gasification means for gasoline engines, wherein the said mixing means are so arranged that the heat-treated fuel-air mixture while passing through said mixing means is caused to rotate in one direction, whereas the fresh air drawn from the said separate air-admission tube is caused to rotate in opposite direction, whereby both currents are thoroughly mixed and their rotatory motions are neutralized with the advantageous result that the final fuel-air mixture while entering the working cylinders does not develop any centrifugal force and is thus prevented from becoming decomposed.

In accordance with an advantageous additional feature of the invention, the improved fuel-gasification means as hereinbefore referred to, include a connection between the carburetor and a source of water vapour e. g. the radiator of the engine for the purpose of incorporating a small proportion of water vapour in the fuel-air mixture and of avoiding deposits of carbonised oil in the heat-treatment and cracking device referred to by forming water gas with said carbonised oil.

Figure 2:
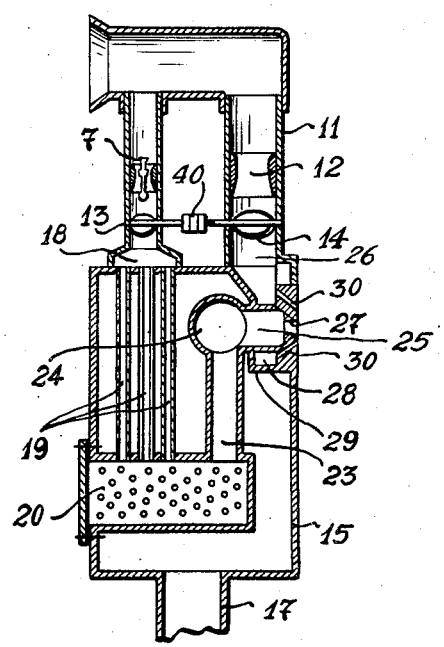

With these objects and advantageous features in view the present invention comprises the arrangement, combination and construction of parts as will be hereinafter fully explained with particular reference to the accompanying drawings, whereon:

Figure 1 schematically shows in elevation the improved fuel-gasification means for gasoline engines according to the invention;

Figure 2 is a vertical sectional view along the line 2—2 of Figure 1, and

Figure 3:
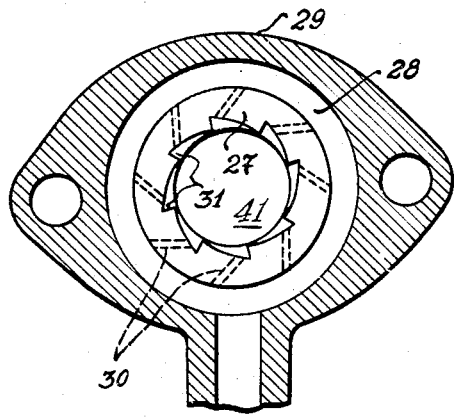
Figure 4:
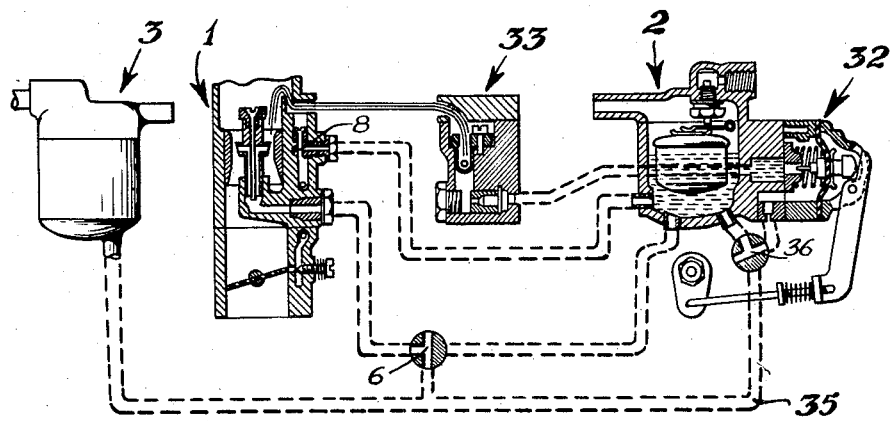
Figure 5:
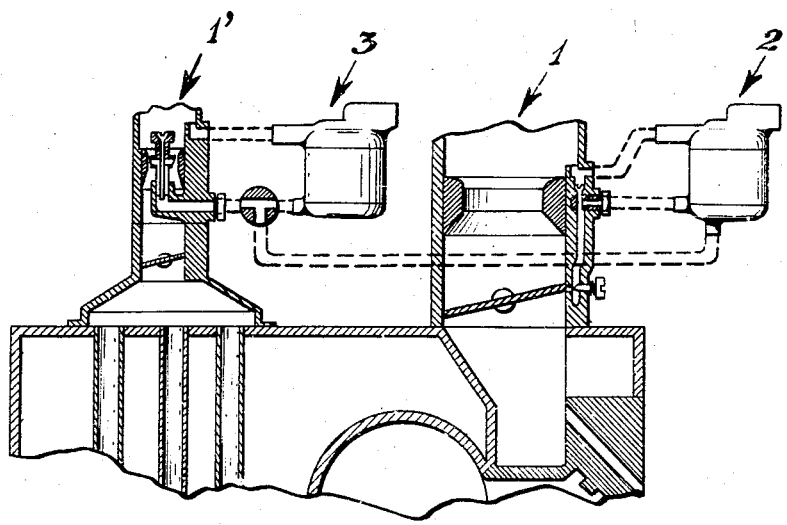

Figure 3 is an enlarged front view of a mixing device as preferably used in the fuel-gasification means according to the invention, whereas Figure 4 is a fragmentary schematic elevation of the carburetor shown in Figure 1, but provided with additional fuel-supply means for full load and with a fuel-injecting pump, and Figure 5 schematically shows the arrangement of two carburetors, one for low-boiling fuel and the other one for high-boiling fuel.

The improved fuel-gasification means for gasoline engines according to the invention and as shown in Figures 1–3 of the accompanying drawings comprises a carburetor 1 having two float chambers 2, 3 for a low and high-boiling fuel, respectively. These chambers are connected by means of the respective chanels 4, 5 and by way of a three-way valve 6 with the main nozzle 7 of the carburetor 1. The float chamber 2 for gasoline or like low-boiling fuel is further directly connected with the idling nozzle system 8 of the carburetor 1.

The cross sectional area of the Venturi 10 of the carburetor 1 is so selected that the volume of air admixed with the quantity of fuel supplied by the main nozzle 7 is insufficient for the combustion of the fuel. The required additional air is drawn in through a separate air-admission tube 11 which is also provided with a Venturi 12. The throttle valve 13 of the carburetor 1 is operatively connected by suitable connecting means 40 with the throttle valve 14 of the air-admission tube 11. The Venturis 10 and 12 are in a determined relation to each other so that the total volume of the supplied combustion air is in any case in accordance with the respective requirements. A proportion which has been practically proved by testing is that the cross sectional area of the Venturi 10 of the carburetor 1 less the cross sectional area of its main nozzle 7 being about one fourth of the cross sectional area of the Venturi 12 of the air-admission tube 11, in which case the cross sectional areas of the carburetor 1 and of the air-admission tube 11 at the level of their respective throttle valves 13, 14 will be of the same proportion of 1:4.

The outlet of the carburetor 1 is directly connected with a heat-treatment and cracking device comprising a casing 15 which may be applied to the working cylinders of a gasoline engine instead of the usual inlet and exhaust ports, for which purpose the casing 15 comprises openings 16 for the entrance of the exhaust gases leaving the working cylinders and an opening 17 for connecting the casing 15 with the usual exhaust pipe (not shown) and for permitting the exhaust gases to escape after heating the interior of the casing 15.

The carburetor 1 directly communicates with a distribution chamber 18 within the casing 15, by means of which the fuel-air mixture supplied by said carburetor is distributed over a plurality of narrow heating tubes 19. Within these tubes the fuel-air mixture is heated to a cracking temperature and so heated enters a cracking chamber 21 partly filled with catalytic material 20. Conveniently the spaces destined for containing the catalyst are confined within the cracking chamber 21 by perforated partition walls 22 or are formed by withdrawable boxes as shown in Figure 2. The gas mixture formed in the heating tubes 19 and elaborated in the cracking chambers 21 by way of the additional heating tubes 23 is conducted into a collector tube 24 which is provided with outlet ports 25 for directing the elaborated gas mixture to the inlets of the working cylinders (not shown).

Each of the outlet ports 25 is provided with mixing means for supplying the said elaborated gas mixture with the required additional combustion air from the air-admission tube 11 by way of the distribution tube 26 (Figure 1). The mixing means of each outlet port 25 comprises an internally conical ring member 27 (Figures 2 and 3) surrounded by a jacket 29 so as to form an annular channel 28. A branch of the distribution tube 26 communicates with the annular channel 28 which in turn by way of small channels 30 is communicated with the narrow outlet opening 41 of the ring member 27, said small channels being arranged in such a manner that they give the fresh air supplied thereby a rotatory motion. The ring member 27 has its inner surface provided with guide means 31 (grooves or ribs) which extend in an inclined straight or helical direction so as to give the gas mixture passing through the ring member a rotatory motion in a direction opposite to that of the fresh air, whereby both currents are thoroughly mixed and their rotatory motions are mutually neutralized with the result that a subsequent decomposition of the final fuel-air mixture is rendered impossible.

The operation of the fuel-gasification device according to the present invention is as follows:

For starting a gasoline engine provided with the improved fuel-gasifying device, the three-way valve 6 by means of a Bowden cable (not shown) is operated in such a manner that the main nozzle 7 of the carburetor 1 is exclusively supplied with a low-boiling fuel such as benzine or gasoline from the float chamber 2 and that the engine starts as usually. As soon as the engine by so operating is heated to a certain degree, the valve 6 is turned to its position in which high-boiling fuel is supplied by the float chamber 3. In view of that the idling system 8 is permanently connected with the float chamber 2, even after changing the position of the valve 6, the engine while running without load automatically operates with the low-boiling fuel. As soon as the throttle valve 13 is progressively opened, more and more high-boiling fuel is supplied from the float chamber 3 and then the engine operates almost exclusively with the supply of the high-boiling fuel. The carburetor may be constructed in such a manner that its idling system is automatically disconnected when the main nozzle is supplied with fuel. It is, however, more advantageous to keep the idling system connected with the float chamber 2 so that the engine always works with a small addition of low-boiling fuel.

In view of the fact that the carburetor 1 by virtue of the small cross sectional area of its Venturi 10 only supplies part of the required volume of combustion air, whereas the rest i. e. the major part thereof is drawn in by way of the air-admission tube 11, the fuel-air mixture in view of its fuel excess is not inflammable. This mixture by way of the distribution chamber 18 and of the heating tubes 19 reaches the cracking chamber 21. Because of the tubes 19 being heated by the exhaust gases to a temperature of about 600–700° C., the fuel-air mixture reaches the cracking chamber in a gasified condition and passes through the catalytic material 20, whereby the transformation of high-boiling fuel into one having an increased octane number and a lower boiling point is rendered more effective. The catalyst may consist of alkaline earths and/or manganese, molybdenum, nickel or their salts in granulated form.

The treated gas mixture then passes through the additional heating tubes 23 into the collector tube 24 and from the latter by way of the ports 25 into the valve chambers of the working cylinders (not shown) after having been thoroughly mixed in the mixing means 27—31 with the fresh air drawn in through the air-admission tube 11.

In view of that the treated gas mixture is thoroughly mixed with the fresh air immediately before it enters the working cylinders, the final fuel-air mixture does not contain any fuel condensate and in addition to this important feature each fuel particle is associated with the quantity of oxygen required for a complete and uniform combustion.

Further, due to the facts that the final fuel-air mixture leaves the mixing devices without any rotatory motion, that these devices are arranged immediately adjacent the cylinder inlets and that the temperature within the cylinders is relatively high, the conditions are such that a further condensation of the fuel cannot occur and that the formation of carbonised oil is avoided.

While the engine is idling, the compression is so low that a low-boiling fuel is absolutely necessary. A low-boiling fuel is also required when a cold engine is to be started and until the fuel-treating device is properly heated. For these reasons the connection 4 of the float chamber 2 for low-boiling fuel with the valve 6 and by way of the latter with the main nozzle 7 is necessary. While the engine operates within the range of medium speeds, it is supplied almost exclusively with high-boiling fuel from the float chamber 3.

The regulation of the proportion of fuel to air shall be in accordance with the theoretically perfect proportion, which means that it should always be such that there is no fuel excess in the final fuel-air mixture, which would cause an incomplete combustion. Therefore, it is convenient to provide the carburetor with an injection pump 32 (Figure 4) and an additional fuel-supply nozzle 33 of known construction and to connect the injection pump 32 by way of channels 34, 35 and a three-way valve 36 with the two float chambers 2 and 3, respectively, because in the case of e. g. coal tar oil being used as high-boiling fuel by virtue of its high octane number, this will be more suitable than gasoline for operating the engine under full load, whereas when gas oil is used, the main nozzle will be better supplied with gasoline.

The fuel-gasifying device according to this invention is conveniently completed by a pipe connection (not shown) between the carburetor 1 and a source of water vapour, for instance, with a cooling-water system. The water vapour which together with the fuel-air mixture enters the heating tubes 19 and the cracking chamber 21, will react with the carbonised oil likely to be deposited on the walls of said heating tubes 19 and said cracking chamber 21 and will form water gas thereby avoiding the obstruction of the fuel treating device 19, 21, by deposits of carbonised oil.

The fuel-gasifying device according to the invention may, of course, be used also for the operation of gasoline engines with a low-boiling fuel. By virtue of that in this case, too, the fuel is completely gasified and its octane number is increased and in view of the fact that the so improved fuel is thoroughly mixed with the combustion air and is prevented from condensing while entering the working cylinders, it will be readily appreciated that also in connection with a low-boiling fuel the advantages of a complete and perfect combustion, of an high output at low fuel consumption and of a longer life of the engines are obtained. In this case, of course, the carburetor 1 will be provided with one float chamber for the low-boiling chamber only.

Finally, the arrangement may also be such that instead of one carburetor and two float chambers, according to the embodiment of the invention shown in Figure 5 two carburetors 1 and 1' are used and each carburetor is provided with a float chamber 2 and 3, respectively. The carburetor 1 and its float chamber 2 exclusively supply a low-boiling fuel, whereas the carburetor 1' and its float chamber 3 supply a high-boiling fuel. The carburetor 1' is connected with the fuel-treating device (19, 21— Figure 1), whereas the carburetor 1 at the same time operates as the air-admission tube 11 (Figure 2). In this case the float chamber 2 may be connected with an injection pump (32, Figure 4) which in turn is connected with a full-load nozzle system (33, Figure 4) associated with the carburetor 1' (Figure 5).

Thus it will be understood that the present invention is by no means restricted to the embodiments as described and shown, but that modifications and improvements may be made therein, and that such modifications and improvements are to be considered as falling within the scope of the invention as clearly set forth in the appended claims.

What I claim as new and desire to secure by Letters Patent is:

1. In an internal combustion engine having at least one working cylinder, a fuel gasifying device comprising, in combination, at least one carburetor, first air admission means in said carburetor comprising a first Venturi, and fuel admission means in said carburetor comprising a nozzle disposed in said first Venturi, said Venturi being so dimensioned relative to said nozzle as to yield a fuel-air mixture enriched in fuel, a fuel treating device connected to the outlet of said carburetor for heating said fuel air mixture so as to completely gasify the same and for thermally and catalytically cracking at least partially the fuel in said mixture, second air admission means comprising a second Venturi of a cross-sectional area substantially larger than said first Venturi, a mixing device connected to said fuel-treating device and to said second air admission means, said mixing means serving for preparing the final air-fuel mixture by homogeneously admixing fresh air from said second air admission means to the treated fuel-air mixture from said fuel treating device by bringing the same together in counter-current rotation, and in such quantities as required for the combustion of the fuel in said final mixture, said mixing means being disposed directly adjacent and connected to the intake opening of said working cylinder for delivering the final air-fuel mixture thereto.

2. In an internal combustion engine having at least one working cylinder, a fuel gasifying device comprising, in combination, at least one carburetor, first air admission means in said carburetor comprising a first Venturi, and fuel admission means in said carburetor comprising a nozzle disposed in said first Venturi, said Venturi being so dimensioned relative to said nozzle as to yield a fuel-air mixture enriched in fuel, a first throttle means connected to the outlet of said carburetor, a fuel treating device connected to said first throttle means, said fuel treating device comprising heat exchange tubes and cracking chambers for heating said fuel air mixture so as to completely gasify the same and for thermally and catalytically cracking at least partially the fuel in said mixture, second air admission means comprising a second Venturi of a cross-sectional area substantially larger than said first Venturi, a second throttle means connected to said second air admission means, said second throttle means being connected to said first throttle means for interdependent actuation of both, a mixing device connected to said fuel treating device and to said second throttle means, said mixing means serving for preparing the final air-fuel mixture by homogeneously admixing fresh air from said second air admission means to the treated fuel-air mixture from said fuel treating device by bringing the same together in counter-current rotation and in such quantities as required for the combustion of the fuel in said final mixture, said mixing means being disposed directly adjacent and connected to the intake opening of said working cylinder for delivering the final air-fuel mixture thereto.

3. In an internal combustion engine having at least one working cylinder, a fuel gasifying device as described in claim 2 wherein said mixing device comprises an internally slightly conical ring member having an outlet opening smaller than its inlet opening and provided with guide means on its inner surface, a jacket member forming an annular channel around said ring member, and a number of small channels connecting said annular channel with said outlet opening of said conical ring member, the inlet opening of said ring member being connected with an outlet port of said heat treatment and cracking system, said annular channel being connected with said second air-admission means and said outlet opening of said ring member being directly connected with a fuel-intake of a gasoline engine, said guide means and said small channels being inclined with regard to the central axis of said ring member and said guide means being inclined at an angle to the inclination of said small channels.

4. In an internal combustion engine having at least one working cylinder, a fuel gasifying device comprising, in combination, a carburetor, first air admission means in said carburetor comprising a first Venturi, and fuel admission means in said carburetor comprising a nozzle disposed in said first Venturi, said Venturi being so dimensioned relative to said nozzle as to yield a fuel-air mixture enriched in fuel, a first float chamber for supplying low-boiling fuel, a second float chamber for supplying high-boiling fuel, conduit means connecting each of said chambers to said carburetor, a control valve in said conduit means for selectively supplying one or the other fuel to said carburetor nozzle, a conventional idling fuel supply device in said carburetor, a conduit means from said first float chamber to said idling device for directly supplying low-boiling fuel to the latter, a fuel treating device connected to the outlet of said carburetor, said fuel treating device comprising heat exchange tubes and cracking chambers for heating said fuel air mixture so as to completely gasify the same and for thermally and catalytically cracking at least partially the fuel in said mixture, second air admission means comprising a second Venturi of a cross-sectional area substantially larger than said first Venturi, a mixing device connected to said fuel treating device and to said second air admission means, said mixing device serving for preparing the final air-fuel mixture by homogeneously admixing fresh air from said second air admission means to the treated fuel-air mixture from said fuel treating device by bringing the same together in counter current rotation and in such quantities as required for the combustion of the fuel in said final mixture, said mixing means being disposed directly adjacent and connected to the intake opening of said working cylinder for delivering the final air-fuel mixture thereto.

5. In an internal combustion engine having at least one working cylinder, a fuel gasifying device comprising, in combination, a first carburetor, first air admission means in said first carburetor comprising a nozzle disposed in said first Venturi, said Venturi being so dimensioned relative to said nozzle as to yield a fuel-air mixture enriched in fuel, a first float chamber for supplying high-boiling fuel to said first carburetor, a second carburetor having a second Venturi of substantially larger cross-sectional area than said first Venturi, a conventional idling fuel supply system in said second carburetor, a second float chamber for supplying low boiling fuel to said second carburetor, said first and second float chambers each comprising a first and second conventional throttle valve in the outlet of said first and second carburetors, respectively, connecting means between said first and second throttle valve for interdependent operation with one another, conduit means from said first chamber to said first float chamber, a three-way valve in said conduit means, pipe means connecting said second float chamber with said three-way valve for supplying low-boiling fuel to said first carburetor, a fuel treating device connected to the outlet of said first carburetor, said fuel treating device comprising heat exchange tubes and cracking chambers for heating said fuel air mixture so as to completely gasify the same and for thermally and catalytically cracking at least partially the fuel in said mixture, a mixing device connected to said fuel treating device and to the outlet of said second air admission means, said mixing device serving for preparing the final air-fuel mixture by homogeneously admixing fresh air from said second carburetor to the treated fuel-air mixture from said fuel treating device by bringing the same together in counter current rotation, and in such quantities as required for the combustion of the fuel in said final mixture, said mixing means being disposed directly adjacent and connected to the intake opening of said working cylinder for delivering the final air-fuel mixture thereto.

References Cited in the file of this patent
UNITED STATES PATENTS

| | | |
|---|---|---|
| 1,187,375 | O'Connor | June 13, 1916 |
| 1,189,688 | Hansen | July 4, 1916 |
| 1,731,135 | Hutchison | Oct. 8, 1929 |
| 1,795,037 | Portail | Mar. 3, 1931 |
| 2,017,643 | Zucrow | Oct. 15, 1935 |
| 2,038,031 | Doyle | Apr. 21, 1936 |